[54] INTERLOCKING RUBBER-JACKETED END CAP AND A RUBBER-COVERED ROLL

[75] Inventors: Patrick M. Hogan; Bobby J. Parr; Manuel B. Hooper, all of Waynesville, N.C.

[73] Assignee: Day International Corporation, Dayton, Ohio

[21] Appl. No.: 178,330

[22] Filed: Apr. 6, 1988

[51] Int. Cl.$^4$ .................................................. B60B 7/04

[52] U.S. Cl. ........................................ 29/119; 29/123; 29/129.5; 193/37; 220/81 R; 220/327

[58] Field of Search ...................... 29/123, 129.5, 118, 29/119; 193/37; 220/81 R, 327

[56] References Cited

U.S. PATENT DOCUMENTS

| | | | |
|---|---|---|---|
| 2,488,764 | 11/1949 | Courtney | 29/119 |
| 2,749,133 | 6/1956 | Rich | 29/123 X |
| 4,229,950 | 10/1980 | Fessenden | 29/123 X |
| 4,315,566 | 2/1982 | Greener et al. | 193/37 |
| 4,316,314 | 2/1982 | Shlykov et al. | 29/123 |
| 4,339,158 | 7/1982 | Greener et al. | 193/37 X |

FOREIGN PATENT DOCUMENTS

| | | | |
|---|---|---|---|
| 2338950 | 2/1975 | Fed. Rep. of Germany | 193/37 |

*Primary Examiner*—Timothy V. Eley
*Assistant Examiner*—Frances Chin
*Attorney, Agent, or Firm*—Killworth, Gottman, Hagan & Schaeff

[57] ABSTRACT

A rubber-covered roll has a cylindrical roll core and a cylindrical sheath of rubber molded about and covering the roll core to provide a rubber-covered roll core. The roll also has a pair of metallic end cap cores and a pair of rubber jackets each molded about one of the end cap cores to partially enclose the same and provide a pair of rubber-jacketed end caps. The rubber-jacketed end caps are attached to opposite ends of the rubber-covered roll core to provide the rubber-covered roll. Each end cap core is annular-shaped and has an inner corner beveled at an approximate forty-five degree angle to define a continuous inner corner surface thereon. Each rubber jacket is molded about the periphery of one of the end cap cores, including about the inner corner surface thereon, to provide the rubber-jacketed end cap core which when attached to one of the ends of the rubber-covered roll core coacts therewith to interlock therebetween an inner portion of the rubber jacket covering the inner corner surface of the end cap core.

15 Claims, 1 Drawing Sheet

84 78 66 96 90 56 92 72 94 88 50 76 74 80 90 60 88 94 82 60 52 62 64 68 86 70 54 58 52

INTERLOCKING RUBBER-JACKETED END CAP AND A RUBBER-COVERED ROLL

BACKGROUND OF THE INVENTION

The present invention generally relates to rubber-covered rolls and, more particularly, to a rubber-jacketed end cap construction and a rubber-covered roll having end caps of such construction at the opposite ends thereof.

Rubber-covered rolls are used in a variety of industrial production lines for manufacturing different products. In one production line for the manufacture of carpeting, textile yarns are processed through heat-setting tunnels in saturated steam under pressure. Pairs of opposed rubber-covered rolls are deployed within the tunnels at the opposite ends thereof for conveying the yarns through the tunnels. Thus, the rolls must have a construction designed to withstand not only the high temperatures and pressures of the heat setting tunnels, but also the pressure from an roll.

One prior art rubber-covered roll construction employed heretofore and described in greater detail below is illustrated in FIG. 1. Briefly stated, the roll includes a cylindrical metallic core having a cover or sheath of rubber molded about and covering its exterior cylindrical surface, and end caps having annular metallic cores partially enclosed in rubber jackets. The rubber jackets are molded in cup-shaped configurations on the exterior of the end cap cores. When each rubber-jacketed end cap is attached to one of the opposite ends of the rubber-covered roll core, an interior surface of the rubber jacket makes flush contact only with an outer portion of a corresponding one of the opposite end surfaces of the rubber sheath, while an interior surface of the end cap core makes flush contact with both an inner portion of the one opposite end surface of the rubber sheath and with an annular shoulder surface on the roll core surrounding an end shaft thereon. The contacting rubber jacket interior surface and rubber sheath end surface are adhesively sealed together while screws are applied to the end cap core to securely fasten it to the roll core.

The objective of such construction is to seal the ends of the rubber-covered roll so as to prevent delamination thereof due to the high pressure and temperature environment of the steam tunnel and the pressures applied by an opposing roll. However, in what seem to be sporadic events, the rubber jackets have been found to shear off and separate from the metallic end cap cores. Consequently, it is perceived that improvements are needed in the construction of the end caps so as to overcome the above-described shortcomings of the prior art rubber-covered roll.

SUMMARY OF THE INVENTION

The present invention provides rubber-jacketed end cap and rubber-covered roll constructions designed to satisfy the aforementioned needs. The rubber-jacketed end cap is used on each opposite end of a rubber-covered core of the roll.

The end cap of the present invention includes a metallic core and a rubber jacket. The metallic core is annular-shaped in overall configuration and generally rectangular shaped in cross-sectional configuration with an inner corner beveled to define a continuous inner corner surface thereon. The rubber jacket is molded about the periphery of the metallic core including about the inner corner surface thereon to provide a rubber-jacketed end cap core which, when attached to one opposite end of the rubber-covered core of the roll, coacts therewith to interlock therebetween an inner portion of the rubber jacket covering the inner corner surface of the metallic core.

More particularly, the metallic core has a pair of outer and inner face surfaces and a continuous outer exterior cylindrical surface. The continuous inner corner surface and outer exterior cylindrical surface are disposed side-by-side and extend between the outer and inner face surfaces. The rubber jacket is molded over the metallic core so as to define an outer jacket portion covering a substantial portion of the outer face surface on the metallic core, an outer exterior jacket portion covering the outer exterior cylindrical surface on the metallic core and an inner jacket portion covering the beveled corner surface on the metallic core.

The rubber-covered roll of the present invention includes the combination of a metallic roll core, a sheath of rubber molded about the roll core, a pair of metallic end cap cores, and a pair of rubber jackets. The metallic roll core is cylindrical-shaped and has an exterior cylindrical surface defined thereon. A pair of shafts project axially and oppositely from opposite ends of the roll core. The rubber sheath extends about and covers the surface of the roll core to provide a rubber-covered roll core. Each rubber jacket partially encloses the periphery of one of the end cap cores to provide a pair of rubber-jacketed end caps. Means, in the form of screw fasteners, are provided for attaching the rubber-jacketed end caps to the opposite ends of the rubber-covered roll core to provide the rubber-covered roll. Otherwise, each end cap has the construction defined earlier.

Accordingly, it is an object of the present invention to provide a rubber-covered roll adapted to tolerate high pressure and temperature environments; to provide end caps for the roll having rubber jackets molded completely about the peripheries of the end cap cores; and to provide rubber-jacketed end caps which, when attached to opposite ends of the rubber-covered core of the roll, coact therewith to interlock inner portions of the rubber jackets therebetween.

DETAILED DESCRIPTION OF THE PREFERRED EMBODIMENT PRIOR ART END CAP AND ROLL CONSTRUCTION

Figure 1:
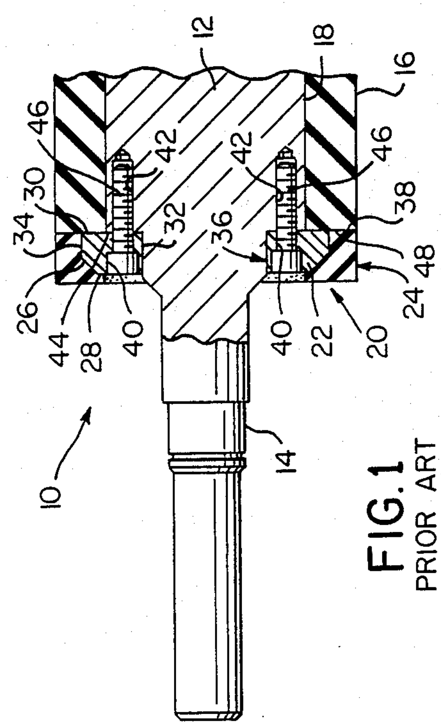
FIG. 1 is a fragmentary side elevational view, partially broken away and sectioned, of a prior art rubber-covered roll and end cap.

Reference is now made to FIG. 1 of the drawings which illustrates a prior art construction of a rubber-covered roll 10 referred to briefly above. The roll 10 includes a cylindrical metallic core 12 having opposite axially-projecting end shafts 14 (only one shown), a cover or sheath 16 of rubber molded about and covering an exterior cylindrical surface 18 of core 12, and end caps 20 (only one shown) having metallic cores 22 partially enclosed in rubber jackets 24 (only one shown) and attached to opposite ends of the core 12.

More particularly, core 22 of each end cap 20 is annular-shaped in overall configuration and is rectangular shaped in cross-sectional configuration with an outer corner beveled at about a forty-five degree angle to define a continuous outer corner surface 26 thereon. End cap 20 thus has an outer beveled corner surface 26, a pair of outer and inner face surfaces 28, 30 and a pair of continuous interior and exterior cylindrical surfaces 32, 34. The outer face surface 28, which is generally parallel to the inner face surface 30 with (both surfaces defined in perpendicular relation to a central axis of the end cap), extends between and intersects outer beveled corner surface 26 and interior cylindrical surface 32. The inner face surface 30 extends between and intersects the interior and exterior cylindrical surfaces 32, 34. The interior cylindrical surface 32, which extends in generally concentric relation with the exterior cylindrical surface about the central axis of the end cap 20, defines a bore 36 through the end cap core 22 for inserting the end cap on one of the end shafts 14 of roll 10.

The rubber jacket 24 of each end cap 20 is molded over the metallic core 22 to assume a cup-shaped configuration covering the outer face surface 28, outer corner surface 26 and exterior cylindrical surface on core 22. As can be seen, rubber jacket 24 does not cover the inner face surface 30 on core 22. An inner surface 38 on each rubber jacket 24 is formed in the plane of the inner face surface 30 on the metallic core 22.

For fastening the rubber-jacketed end caps 20 to opposite ends of the rubber sheath 16 and metallic roll core, each of the end cap cores 22 has a plurality of countersunk holes 40 drilled therethrough which open at the respective outer and inner face surfaces 28, 30. The end cap core holes 40 are defined in a pattern matching that of a plurality of holes 42 tapped in continuous end shoulder surfaces 44 (only one shown) on roll core 12 which extend about end shafts 14 thereof in perpendicular relation to the longitudinal central axis of roll core 12. Thus, when end caps 20 are inserted over the shafts 14 and placed with their inner face surfaces 30 flush with the end shoulder surfaces 44 of the roll core 12, screws 46 are inserted through the end cap core holes 40 and threaded into the roll core holes 42 for fastening the rubber-jacketed end caps 20 to the roll core 12. Further, rubber jackets 24 at their inner surfaces 38 are adhesively bonded to opposite end surfaces 48 (only one shown) defined on the rubber sheath 16.

It can be readily observed that no portion of rubber jacket 24 of each end cap 20 is disposed between the end cap core 22 and the end surfaces 44, 48 of the roll core 12 and rubber sheath 16. Therefore, no interlocking relation is present between the end cap core 22 and rubber-covered roll core 12 with respect to the rubber jacket 24 on the end cap core 22. Because of the pressure on the rubber jacket from an opposing roll, the absence of such relation makes the end caps 20 of the prior art rubber-covered roll 10 vulnerable over time to loosening and shearing off, resulting in partial exposure of the opposite ends of the rubber-covered roll core 12 to high temperature and pressure environments. Such exposure will eventually adversely affect the structural integrity of the roll 10. Additionally, as the rubber from which rubber jacket 24 is fabricated is typically hard than the rubber composition of rubber sheath 16, the absence of jacket 24 from the roll structure has an immediate adverse effect on the performance of opposing roll pairs during operation.

END CAP AND ROLL CONSTRUCTION OF THE PRESENT INVENTION

Figure 3:
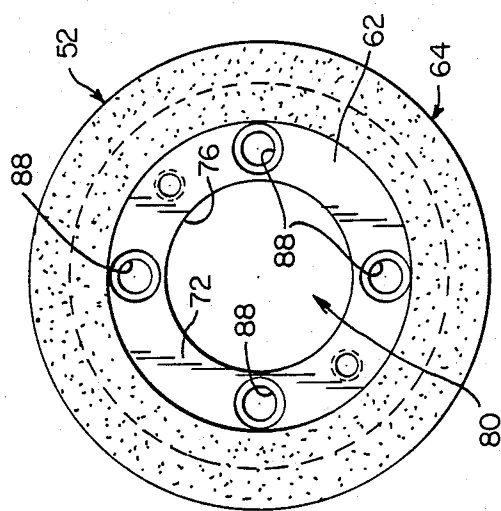
FIG. 3 is an end elevational view of the end cap as seen along line 3—3 of FIG. 2.
Figure 2:
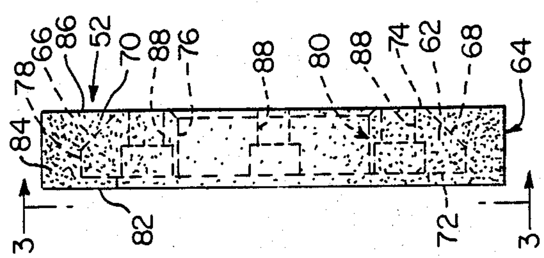
FIG. 2 is a side elevational view of a rubber-jacketed end cap having the construction of the present invention.
Figure 4:
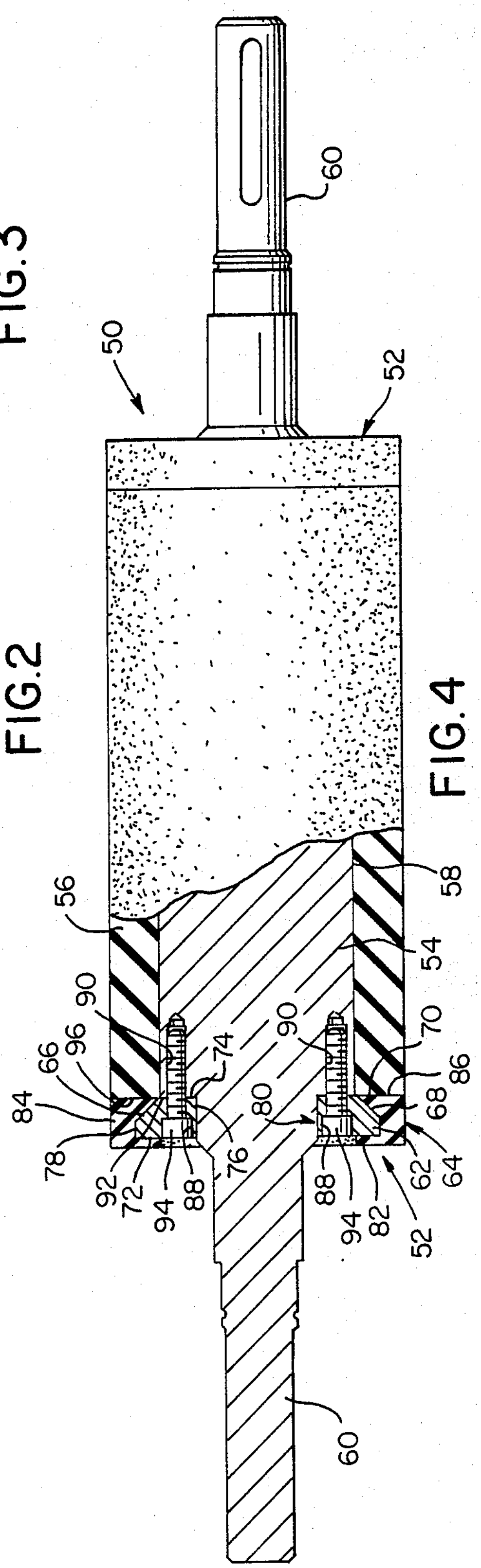
FIG. 4 is a side elevational view, partially broken away and sectioned, of a rubber-covered roll having the construction of the present invention.

Turning now to FIGS. 2–4, there is illustrated the preferred embodiment of a rubber-covered roll 50 and rubber-jacketed end caps 52 employed at the opposite ends of roll 50 which comprise the preferred embodiment of the present invention. In its basic components, roll 50 includes a cylindrical metallic roll core 54 and a cylindrical sheath 56 of rubber molded about and covering the roll core 54 to provide a rubber-covered roll core. The roll core 54 also has an exterior cylindrical surface 58 defined thereon about which the rubber sheath 56 extends and a pair of elongated shafts 60 oppositely and axially projecting from opposite ends of the roll core 54. Roll 50 also has a pair of metallic end cap cores 62 and a pair of rubber jackets 64. Each rubber jacket 64 is molded about one of the end cap cores 62 to partially enclose the same and provide a pair of rubber-jacketed end caps 52. The rubber-jacketed end caps 52 are attached to opposite ends of the rubber-covered roll core 54 to provide rubber-covered roll 50.

More particularly, each end cap core 62 of roll 50 is annular-shaped in overall configuration and rectangular-shaped in cross-section except for an inner exterior corner 66 thereon being beveled at an approximate forty-five degree angle to define a continuous inner corner surface 68 thereon. Each rubber jacket 64 is molded about the periphery of one of the end cap cores 62, and the inner corner surface 66 thereon, to provide the rubber-jacketed end cap core 54. Thus, when each rubber-jacketed end cap core 62 is attached to one end of rubber-covered roll core 54, the end cap and roll cores 62, 54 coact together to interlock therebetween an inner portion 70 of the rubber jacket 64 covering the inner corner surface 66 of end cap core 62.

End cap core 62 has an inner exterior beveled corner surface 68, a pair of outer and inner face surfaces 72, 74 and a pair of continuous interior and outer exterior cylindrical surfaces 76, 78. The inner exterior beveled corner surface 68 and the outer exterior cylindrical surface 78 are disposed side-by-side and extend between the outer and inner face surfaces 72, 74. Outer face surface 72, which is generally parallel to inner face surface 74 with both surfaces defined in perpendicular relation to a central axis of the end cap 52, extends between and intersects the outer exterior cylindrical surface 78 and interior cylindrical surface 76. The inner face surface 74 extends between and intersects the interior cylindrical surface 76 and inner exterior corner surface 68. The outer exterior cylindrical surface 78 intersects inner corner surface 68. Interior cylindrical surface 76, which extends in generally concentric relation with outer exterior cylindrical surface 78 about the central axis of end cap 52, defines a bore 80 through end cap core 62 for inserting end cap 52 on one of the end shafts 60 of roll 50.

Rubber jacket 64 is molded from a doughnut shaped preform of rubber via a conventional compression molding process over the end cap core 62. Generally, it is desirable that the rubber composition of jacket 64 be harder than the rubber on sheath 56 so that in operation, pressure is applied on opposing pairs of rolls along opposing jackets. Rubber jacket 64 defines an outer jacket portion 82 covering a substantial portion of the outer face surface 72 on the end cap core 62, an outer exterior jacket portion 84 covering the outer exterior cylindrical surface 78 on the end cap core 62, and an inner jacket portion 70 covering the inner exterior corner surface 68 on end cap core 62. Further, rubber jacket 64 has an inner surface 86 on the inner jacket portion 70 defined in the plane of the inner face surface 74 on end cap core 62.

For fastening the rubber-jacketed end caps 52 to opposite ends of rubber-covered roll core 54, each end cap core 62 has a plurality of countersunk holes 88 drilled therethrough which open at the respective outer and inner face surfaces 72, 74. The end cap core holes 88 are defined in a pattern matching that of a plurality of holes 90 tapped in continuous end shoulder surfaces 92 on the roll core 54 which extend about the end shafts 60 thereof in perpendicular relation to the longitudinal central axis of roll core 54. Thus, when end caps 52 are inserted over shafts 60 and placed with their inner face surfaces 74 flush with the end shoulder surfaces 92 of roll core 54, screws 94 are inserted through the end cap core holes 88 and threaded into the roll core holes 90 for securely fastening the rubber-jacketed end caps 52 to the roll core 54. Also, rubber jackets 64 at their inner surfaces 86 are adhesively bonded to opposite end surfaces 96 defined on the rubber sheath 56.

It can be readily observed that the inner portion 70 of the rubber jacket 64 of each end cap 52 is disposed in a clamped relation between the end cap core inner corner surface 68 and the one end surface 96 of rubber sheath 56. Therefore, an interlocking relation is present between end cap core 62 and rubber-covered roll core 54 with respect to the rubber jacket 64 on end cap core 62. The presence of such relation makes the end caps 52 of the present invention substantially invulnerable over time to loosening and shearing off the roll 50.

Having thus described the rubber-jacketed end caps and rubber-covered roll of the present invention in detail and by reference to a preferred embodiment thereof, it will be apparent that certain modifications and variations are possible without departing from the scope of the invention defined in the appended claims.

What is claimed is:

1. A rubber-jacketed end cap for use on a rubber-covered core of a roll, said end cap comprising:

(a) a metallic core having inner and outer face surfaces, said metallic core being annular-shaped in overall configuration and rectangular shaped in cross-sectional configuration except for an inner corner opposite said outer face surface being beveled to define a continuous inner corner surface thereon; and (b) a rubber jacket molded about the periphery of said metallic core including about said inner corner surface thereon and covering a substantial portion of said outer face surface to provide a rubber-jacketed end cap core which when attached to an opposite end of said rubber-covered core of said roll coacts therewith to interlock therebetween an inner portion of said rubber jacket covering said inner corner surface of said metallic core.

2. The end cap of claim 1 in which said inner corner surface is beveled at about a forty-five degree angle.

3. The end cap of claim 1 in which said metallic core has a continuous outer exterior cylindrical surface, said continuous inner corner surface and said exterior cylindrical surface disposed side-by-side and extending between said outer and inner face surfaces.

4. The end cap of claim 3 in which said rubber jacket is molded over said metallic core so as to define an outer jacket portion covering a substantial portion of said outer face surface on said core, an outer exterior jacket portion covering said outer exterior cylindrical surface on said core, and said inner jacket portion covering said beveled corner surface on said core.

5. The end cap of claim 4 in which said rubber jacket has an inner surface on said inner jacket portion in the plane of said inner face surface on said metallic core.

6. The end cap of claim 3 in which said outer and inner face surfaces on said metallic core are disposed generally parallel to one another, said outer face surface intersecting said outer exterior cylindrical surface on said metallic core and said inner face surface intersecting said inner corner surface on said metallic core.

7. The end cap of claim 6 in which said outer exterior cylindrical surface intersects said inner corner surface.

8. In a rubber-covered roll, the combination comprising:

(a) a metallic roll core having an exterior surface defined thereon;

(b) a sheath of rubber molded about and covering said exterior surface of said roll core to provide a rubber-covered roll core;

(c) a pair of metallic end cap cores;

(d) a pair of rubber jackets each partially enclosing one of said end cap cores to provide a pair of rubber-jacketed end caps; and (e) means for attaching said rubber-jacketed end caps to opposite ends of said rubber-covered roll core to provide said rubber-covered roll;

(f) each of said end cap cores being annular-shaped in overall configuration and having a cross-sectional configuration which includes an inner corner being beveled to define a continuous inner corner surface thereon;

(g) each of said rubber jackets being molded about the periphery of one of said end cap cores including about said inner corner surface thereon to provide said rubber-jacketed end cap core which when attached to one of said ends of said rubber-covered roll core coacts therewith to interlock therebetween an inner portion of said rubber jacket covering said inner corner surface of said end cap core.

9. The roll of claim 8 in which said inner corner surface of said end cap core is beveled at about a forty-five degree angle.

10. The roll of claim 8 in which said end cap core has a pair of outer and inner face surfaces and a continuous outer exterior surface, said continuous inner corner surface and said outer exterior surface disposed side-by-side and extending between said outer and inner face surfaces.

11. The roll of claim 10 in which said rubber jacket is molded over said end cap core so as to define an outer jacket portion covering a substantial portion of said outer face surface on said end cap core, an outer exterior jacket portion covering said outer exterior surface on said end cap core, and said inner jacket portion covering said beveled corner surface on said end cap core.

12. The roll of claim 10 in which said rubber jacket has an inner surface on said inner jacket portion in the plane of said inner face surface on said end cap core.

13. The roll of claim 10 in which said outer and inner face surfaces on said metallic core are disposed generally parallel to one another, said outer face surface intersecting said outer exterior surface on said end cap core and said inner face surface intersecting said inner corner surface on said core.

14. The roll of claim 13 in which said outer exterior surface intersects said inner corner surface.

15. In a rubber-covered roll, the combination comprising:

(a) a cylindrical metallic roll core having an exterior cylindrical surface defined thereon and a pair of shafts oppositely axially-projecting from opposite ends of said roll core;

(b) a cylindrical sheath of rubber molded about and covering said exterior cylindrical surface of said roll core to provide a rubber-covered roll core;

(c) a pair of annular-shaped metallic end cap cores;

(d) a pair of rubber jackets molded about said end cap cores so as to partially enclose the same and provide a pair of rubber-jacketed end caps; and (e) means for attaching said rubber-jacketed end caps to opposite ends of said rubber-covered roll core to provide said rubber-covered roll;

(f) each of said annular-shaped end cap cores having an inner corner being beveled at about forty-five degree angle to define a continuous inner corner surface thereon;

(g) each of said rubber jackets being molded about the periphery of one of said end cap cores, including about said inner corner surface thereon, to provide said rubber-jacketed end cap core which when attached to one of said ends of said rubber-covered roll core coacts therewith to interlock therebetween an inner portion of said rubber jacket covering said inner corner surface of said end cap core.

* * * * *